Oct. 14, 1969 S. BÖHM 3,472,139
SINGLE LENS REFLEX CAMERAS WITH SWINGING-FLAP SHUTTER
Filed March 7, 1967 6 Sheets-Sheet 1

INVENTOR
SIEGFRIED BÖHM
By Young + Thompson
ATTYS.

Oct. 14, 1969 S. BÖHM 3,472,139
SINGLE LENS REFLEX CAMERAS WITH SWINGING-FLAP SHUTTER
Filed March 7, 1967

INVENTOR
SIEGFRIED BÖHM
BY Young + Thompson
ATTYS.

Oct. 14, 1969  S. BÖHM  3,472,139
SINGLE LENS REFLEX CAMERAS WITH SWINGING-FLAP SHUTTER
Filed March 7, 1967  6 Sheets-Sheet 3

INVENTOR
SIEGFRIED BÖHM
BY Young + Thompson
ATTYS.

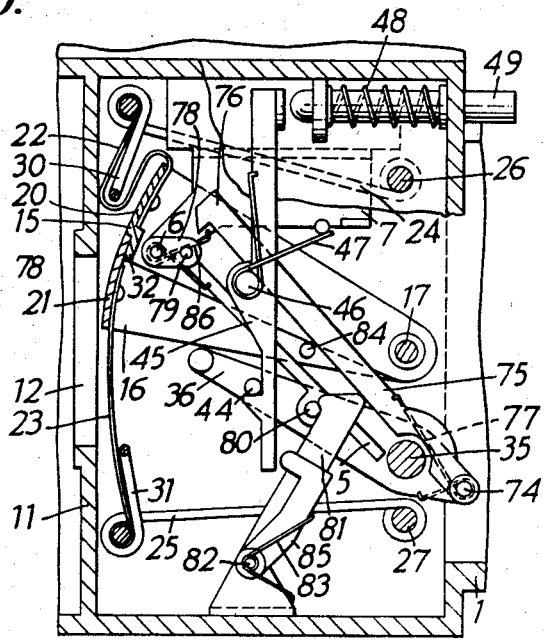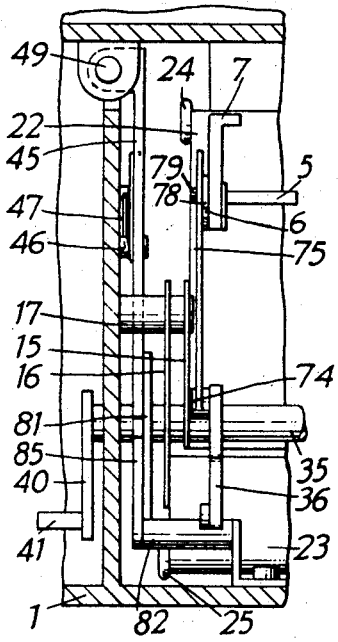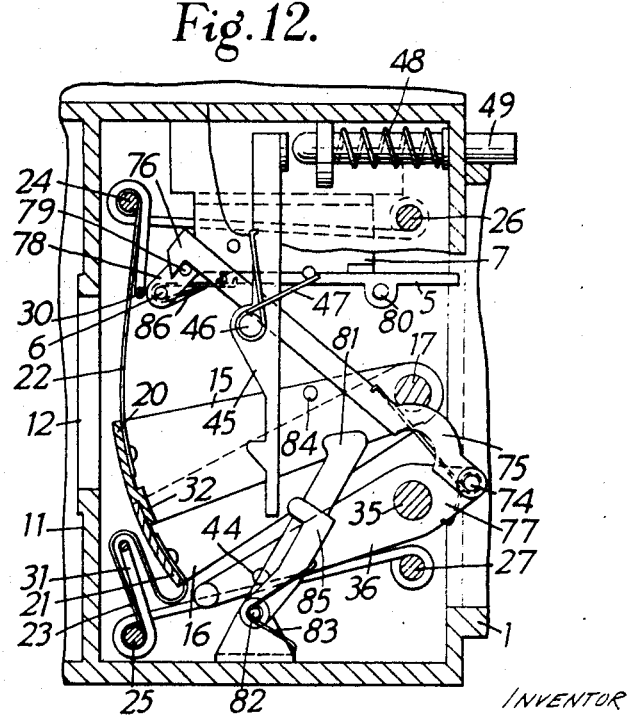

3,472,139
SINGLE LENS REFLEX CAMERAS WITH SWINGING-FLAP SHUTTER

Siegfried Bohm, Dresden, Germany, assignor to VEB Pentacon Dresden Kamera und Kinowerke, Dresden, Germany
Filed Mar. 7, 1967, Ser. No. 621,178
Int. Cl. G03b *19/12*
U.S. Cl. 95—42         10 Claims

ABSTRACT OF THE DISCLOSURE

A photographic camera having a shutter comprising two-part cylindrical swinging-flaps movable along a single curved path between the objective and film gate about a common pivot. The two flaps abut along straight edges when the shutter is closed in either its cocked or normal rest position. The arcuate length of each of the part cylindrical flaps is shorter than the height of the film gate aperture. To each shutter part is connected a flexible curtain which is secured at one end to the shutter part and at the other end to a fixed part of the housing on to a tensioning device. On release of the shutter after cocking, the two flaps run off in sequence to effect exposure.

---

The invention relates to a photographic camera, with or without reflex apparatus, in which a swinging-flap shutter is provided to achieve the exposure of the emulsion support before the film gate.

Photographic cameras with arrangement of a swinging-flap shutter are known. In this case however it is exclusively a matter of those photographic cameras which do not possess a reflex apparatus, but in which the ray path coming from the objective lens arrives directly on the emulsion support, here provided as film, when the shutter in running off is open.

In these known embodiments of photographic cameras having swinging-flap shutters, the shutter consists essentially of two swinging flaps which are movable about a common pivot pin either parallel with or perpendicularly to the film and run with their cylindrically curved shutter parts past the film gate, clearing the film gate for the exposure and covering it off again according to the exposure time set in each case. The manner in which this takes place is that after the release of the shutter situated in the cocked position, in which the swinging-flaps completely cover the film gate, in the spring-driven running-off firstly the one swinging-flap gradually clears the film gate and thereupon the second swinging-flap follows, according to the exposure time in each case, forming a slot width adapted thereto, and in so following gradually covers the film gate again.

It is common to these swinging-flap shutters of known construction and manner of operation that in the case of each swinging-flap the cylindrically curved shutter part which runs past the film gate is made so large, and here also must be made so large, that both in the cocked position of the shutter and in its run-off position the cylindrically curved shutter part of the swinging-flap completely covers the film gate and protrudes beyond it on all sides, so that the penetration of harmful light to the film is prevented when the shutter is closed.

This requisite size which the cylindrically curved shutter parts of each individual swinging-flap must possess however on the one hand produces correspondingly greater mass forces and inertia moments, which have an unfavourable effect upon the manner of operation of the shutter. On the other hand the shutter occupies a correspondingly large space in the photographic camera, on account of the large, cylindrically curved shutter parts of the swinging-flaps, for their arrangement and movement, whereby the dimensions of the camera are correspondingly enlarged. This however is not desired, especially in the case of miniature cameras, and also causes high production costs.

One decisive disadvantage of the known embodiments of swinging-flap shutters consists however in that their use is unsuitable for those photographic cameras where a mirror-reflex apparatus is provided. This is because in the known swinging-flap shutters the swinging-flaps prevent the arrangement of the mirror-reflex apparatus within the camera housing between objective lens and shutter, on account of their cylindrically curved shutter parts protruding beyond the film gate and of the large range of movement on both sides of the film gate caused by these parts.

The conditions here set forth also apply in the same way to the known photographic cameras where the shutter does not consist of swinging-flaps but the shutter elements are formed as cylindrically curved sliders, run in a circular guide path past the film gate and thus effect the exposure of the film according to the time set in each case.

It is the purpose and problem of the invention to provide a photographic camera having a swinging-flap shutter where the stated disadvantages of the known photographic camera with swinging-flap shutter are removed and more especially the shutter is so constructed that its use is suitable both for photographic cameras without and for those with mirror-reflex apparatus.

The invention is here based upon a photographic camera having a swinging-flap shutter, where at least two swinging-flaps subject to spring action and movable about common pivot pins, and devices for the control of the exposure time and for the winding up of the film-conveying means and the shutter are provided. The invention relates firstly to the particular formation of the swinging-flap shutter provided in the photographic camera, which formation is characterised in that in each swinging-flap the length of the cylindrically curved shutter part is shorter than the height or width of the film gate aperture, and in that with these shutter parts there are connected flexible curtains which are secured with their other ends either non-displaceably or to movably mounted tensioning members subject to spring effect.

In further development of the invention for the cocking of the swinging-flaps there is provided a common winding device coupled with the film-winding, by which the two swinging-flaps and, in the case of provision of a reflex apparatus, the mirror also are transferable, after their running-off, into the blockable and releasable cocked position. The release of the swinging-flap shutter is effected through a regulable time-setting device, which is mechanically or electrically controllable.

According to the proposed construction of a photographic camera having a swinging-flap shutter according to the invention, here in distinction from the initially explained known forms of embodiment the swinging-flaps do not possess cylindrically curved shutter parts which in each case overlap the entire film gate, but the swinging-flaps according to the invention are so formed that the length of the cylindrically curved shutter parts is shorter than the height or the width of the film gate aperture. Thus firstly a corresponding reduction is achieved in the dimensions of the swinging-flaps and the mass and inertia moments which are to be overcome in their running-off. The favourable manner of operation thus obtained is not disadvantageously influenced by the flexible curtains connected with the shutter parts, because of these, in the running-off of the shutter, the one curtain merely rolls out and the other curtain merely rolls in.

The formation of the narrow shutter flaps in combination with the flexible curtains, which here can roll up and down in the region of the housing wall of the film gate, produces, on account of the thus limited space requirements and range of movement, correspondingly smaller dimensions for the photographic camera and the further considerable advantage that thus the arrangement of a mirror-reflex apparatus between the shutter and the picture-taking objective lens in the camera housing is no way prevented or hindered. Thus the invention has for the first time produced the possibility of exploiting the advantages of the swinging-flap shutter, which derive from its simple style of construction and manner of operation, even in photographic cameras having a mirror-reflex apparatus.

In the following statements and in the drawings according to FIGURES 1–12 examples of embodiment of the invention are described and represented, from which further features of the invention may be seen.

In FIGURES 1–4 there is represented an example of embodiment of the invention in the case of a monocular mirror-reflex camera, where the flexible curtains connected with the two swinging-flaps are connected each with a movably mounted tensioning member subject to spring action.

Figure 5:
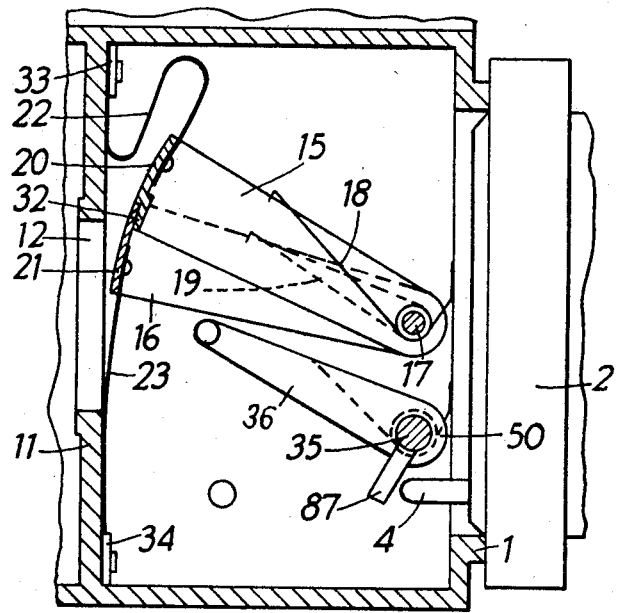
Figure 6:
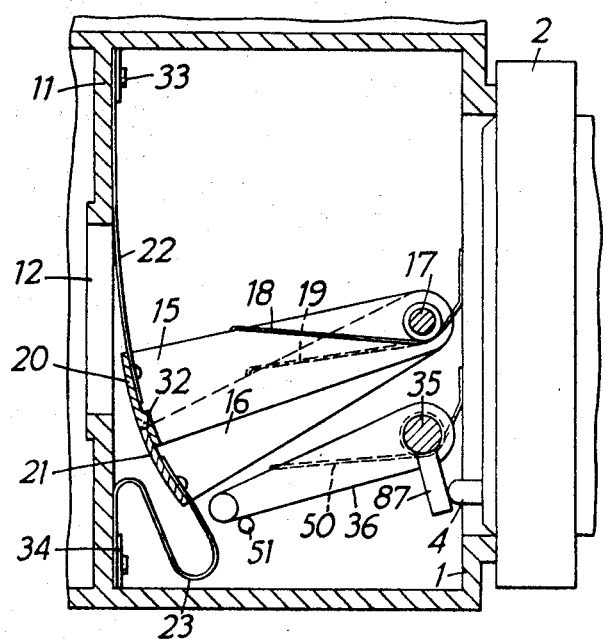

In FIGURES 5 and 6 there is shown in lateral elevation and section a further example of embodiment of the invention in a photographic camera without mirror-reflex apparatus, the curtains connected with the swinging-flaps being secured in each case on the camera housing. Here FIGURE 5 shows the shutter in the cocked position and FIGURE 6 the shutter in the run-off position.

FIGURES 7, 8, 9a, 9b show, in section, the devices for the mechanical and electrical release of the shutter and the control of the exposure time.

FIGURES 10–12 show, in a photographic camera having a reflex apparatus, according to the invention, a gearing for the winding up and release of the reflex mirror.

According to the example of embodiment in FIGURES 1–4, 1 designates the housing of a monocular mirror-reflex camera, which preferably possesses an exchangeable picture-taking objective 2 in which there is installed the diaphragm 3, which is controllable by a plunger 4 movably mounted in the picture-taking objective 2. The ray path coming from the picture-taking objective 2 is deflected, by a reflex mirror 5 inclined for this purpose at 45° and pivotally mounted about the pivot pins 6 of the viewfinder shaft 7, towards a viewfinder device, which consists of the image-field lens 8, the reversing prism 9 and the eyepiece 10, through which the image projected by the picture-taking objective 2 can be viewed.

The reflex mirror 5 can be pivoted into and out of the objective ray path and in the hinged-up position closes the viewfinder shaft 7. When the reflex mirror 5 is hinged up and the shutter is opened the objective ray path passes through the film gate 12 provided in the film trap 11 on to the film 13, which is pressed by means of a presser plate 14 in known manner, by a spring force (not shown), against the film trap 11.

In the camera housing 1 there is arranged the shutter, which comprises two swinging-flaps 15, 16 which are pivotable commonly about the pivot pins 17 and are subject to the action of the springs 18, 19, which effect the running-off of the swinging-flaps 15, 16 after their release.

Figure 4:
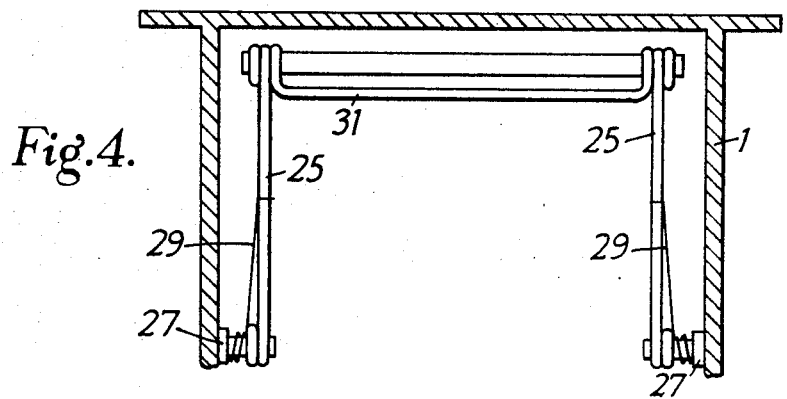
FIGURE 4 shows as detail, in plan view, the arrangement and formation of a tensioning member for the curtain.

Each swinging-flap 15, 16 possesses a cylindrically curved shutter part 20, 21, on the inner side of which there is secured in each case a flexible curtain 22, 23. Each curtain is connected at its other end with a tensioning member 24, 25, which are movably mounted about the pivot pins 26, 27 and subject to the action of the springs 28, 29. The tensioning members 24, 25 are so constructed—as shown especially by FIGURES 2–3—that on the one hand by the action of their springs 28, 29 they hold the curtains 22, 23 under tension, on the other hand they render rolling in by their guides 30, 31 possible. FIGURE 4 shows in plan view the arrangement and formation of the lower tensioning member 25 with guide 31.

Figure 2:
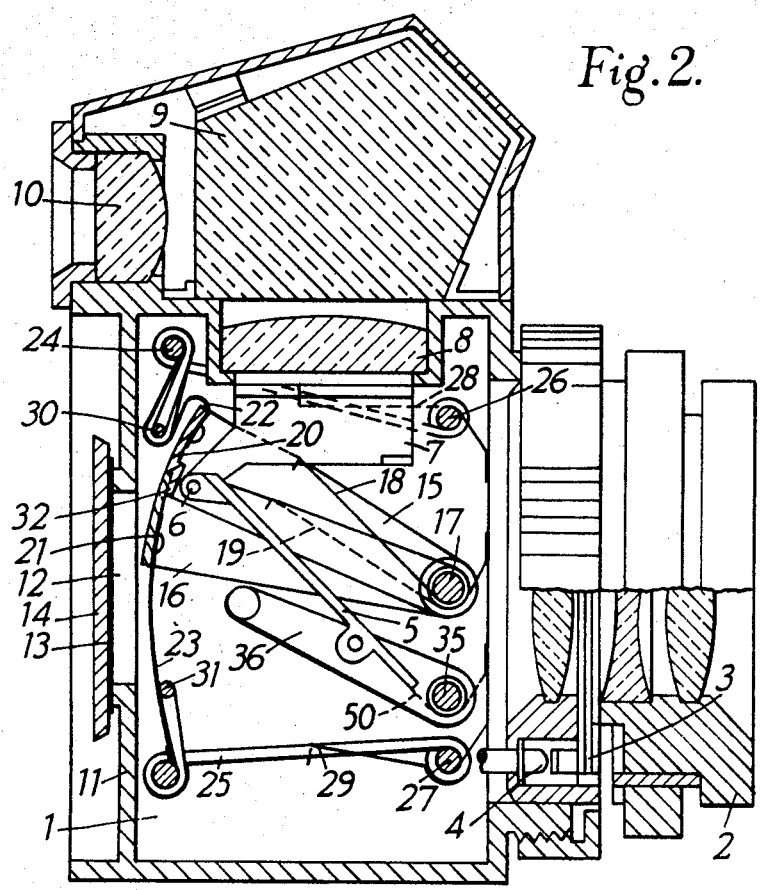
FIGURE 2 shows a lateral elevation with section of FIGURE 1.
Figure 3:
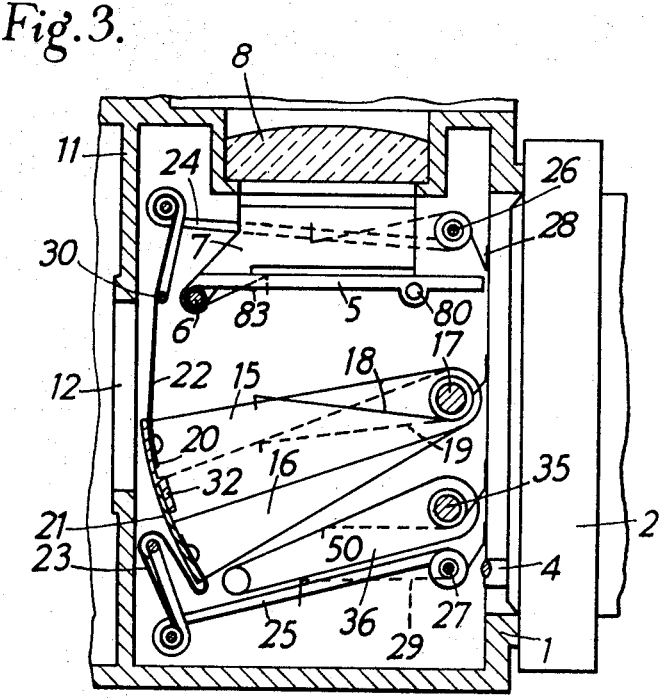
FIGURE 3 shows a part of the lateral elevation with section of FIGURES 1 and 2, where the shutter is situated in the run-off position.

As regards the swinging-flaps 15, 16, in the case of at least one swinging-flap, as shown in FIGURES 2 and 3, the cylindrically curved shutter part 20 is provided with a cranked portion 32, over which the cylindrically curved shutter part 21 of the other swinging-flap can slide itself in. Thus a light-tight covering is guaranteed in the cocking of the shutter and in its closed position.

When the shutter is situated in the wound-up position, namely in the cocked position, which is shown by FIGURE 2, then the curtain 22 connected with the upper swinging-flap 15 has formed a loop around the guide 30 of the upper tensioning member 24 and thereby been rolled in, while in the case of the lower swinging-flap 16 the curtain 23 connected therewith is held under tension by the spring-loaded tensioning member 25. When on the other hand the shutter is in the run-off position shown by FIGURE 3, the curtain 23 connected with the lower swinging-flap 16 has formed a loop around the guide 31 of the tensioning member 25 and thus rolled itself in, while in the case of the upper swinging-flap 15 the curtain 22 connected therewith is held under tension by the spring-loaded tensioning member 24.

Thus the construction and manner of operation of the shutter according to the invention as set forth achieves the object that despite the formation of the swinging-flaps 15, 16 with narrow, cylindrically curved shutter parts 20, 21 in common with the curtains 22, 23 connected therewith, a complete covering of the film gate 12 is ensured in both the wound-up and run-off positions of the shutter. Moreover due to this formation of the swinging-flaps 15, 16 in combination with the flexible curtains 22, 23, which here move and roll in close to the back of the film trap 11, the range of movement of the shutter is so limited that thus the arrangement of a mirror-reflex apparatus is possible between the shutter and the picture-taking objective 2, while as shown especially by FIGURES 2 and 3 the space existing between the film gate 11 and the viewfinder shaft 7 can also be exploited for the rolling-in of the upper curtain 22.

In FIGURES 5 and 6 a further example of embodiment of the invention is illustrated. Here the flexible curtains 22, 23, connected with the cylindrically curved shutter parts 20, 21 of the swinging-flaps 15, 16 are made fast with their ends non-displaceably in the camera housing 1 on the film trap 11 on both sides of the film gate 12, for example by screwing by means of strips 33, 34. In the case of this embodiment thus the securing of the flexible curtains 22, 23 to spring-loaded, movably mounted tensioning members is omitted. Thus a simplified embodiment is achieved, which can be preferred especially for photographic cameras with miniature and sub-miniature formats.

For the winding-up of the swinging-flap shutter there is provided according to the invention a gearing which comprises essentially, as shown by all figures, a cocking shaft 35 pivotally mounted in the camera housing 1 with the cocking levers 36, 37, which engage on both sides on the lower swinging-flap 16 and in the winding-up movement transfer the two swinging-flaps 16, 15 against the action of their springs 18, 19 upwards into the cocked position. The winding-up movement is effected through a winding-up shaft 38 which carries an axially acting cam disc 39, on which there slides with its pin 41, which can also be formed as a roller, a control lever 40 connected with the cocking shaft 35. The film take-up spool 42, which is subject to the action of a friction coupling 43, is mounted for rotation about the winding-up shaft 38. The winding-up shaft 38 is in connection with a film-winding gearing and its actuation can take place through a hand knob or a free-wheel device by means of a reciprocally movable quick-winding lever. It has not been thought necessary to represent these actuating devices, which are known per se.

Figure 7:
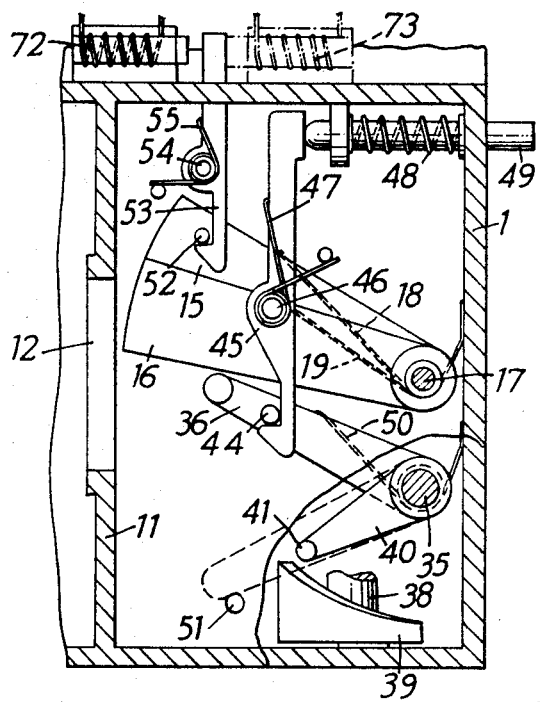
Figure 8:
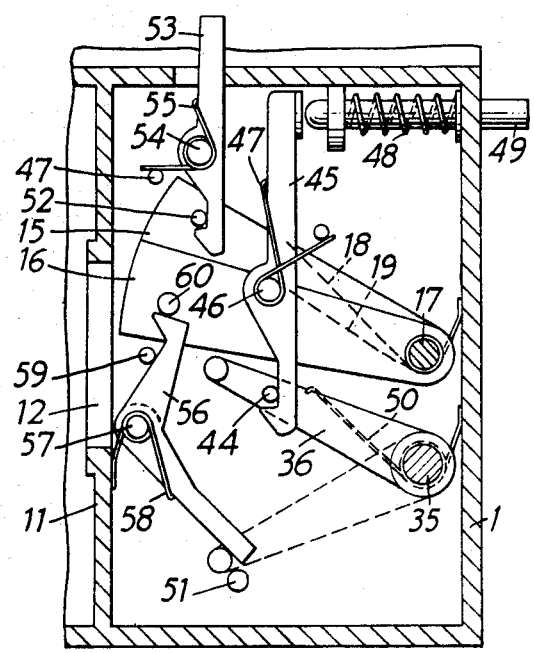

On the cocking lever 36 of the cocking shaft 35 there is secured a blocking pin 44, with which, when the shutter is in the cocked position, as shown by FIGURE 7, there engages a blocking lever 45 which is movably mounted about the bolt 46 and is moved into the blocking position by the torsion spring 47. In the camera housing 1 there is mounted an axially displaceable release knob 49 subject to the action of a return spring 48, which knob acts upon the blocking lever 45 and thus effects the release of the shutter. Here the cocking shaft 35 subject to the action of the torsion springs 50 is liberated for return into the initial position limited by a stop 51 and thus at the same time the lower swinging-flap 16 is liberated for running-off, while the upper swinging-flap 15 is still temporarily prevented from running-off by a time lever 53 engaged with its blocking pin 52. The time lever 53 is movably mounted about the bolt 54 and is moved by a torsion spring 55 into the blocking position.

According to the example of embodiment as illustrated in FIGURE 7, when the shutter is in the wound-up position and cocked, after the release of the cocking shaft 35, with its return movement into the initial position the running-off of the lower swinging-flap 16 takes simultaneously. According to the example of embodiment in FIGURE 8 an additional double-armed operating lever 56 is arranged, which is movably mounted about the bolt 57 and moved by a torsion spring 58 against the stop 59 which limits the blocking position. In this position the operating lever 56 engages with the other arm under the blocking pin 60 of the lower swinging-flap 16 and thus blocks the shutter in the wound-up position. On the liberation of the cocking shaft 35, effected by the release knob 49 through the blocking lever 45, its cocking lever 36 strikes upon the lower arm of the operating lever 56 and moves the latter out of the blocking position, so that only then can the swinging-flap 16, and thereupon after release of the time lever 53 the upper swinging-flap 15, run off. This embodiment achieves the object that the swinging-flaps 15, 16 run off uninfluenced after their release and due to the lead of the cocking shaft 35 a slot formation of the swinging-flaps 15, 16 can already be produced with the commencement of their running-off, which is advantageous especially in the obtaining of short exposure times.

The running-off of the upper swinging-flap 15 is liberated by the time lever 53, which is releasable in a manner known per se in connection with a mechanically, electrically or electronically working exposure-time control.

Figure 9A:
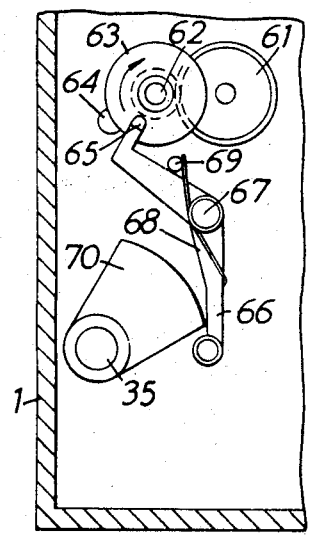

According to the diagram as illustrated in FIGURE 9a, for the release of the time lever 53 there is provided an escapement 61 which runs off by spring force, in which on a pinion 62 there is connected an actuating disc 63 which comprises a dog 64 and a catch 65. In the latter there engages an operating lever 66 which is movably mounted about the bolt 67 and is moved by a torsion spring 68 into the blocking position limited by a stop 69. The operating lever 66 lies with its other arm in the range of movement of a control disc 70 of the cocking shaft 35. After liberation out of the wound-up position the cocking shaft 35 moves the operating lever 66, by means of the control disc 70, out of the blocking position and thus liberates the running-off of the escapement 61, which, through the dog 64 through a connection (not shown), moves the time lever 53 out of the blocking position and thus releases the running-off of the swinging-flap 15. The instant of release thereof can be regulated in known manner by the connection and disconnection of wheel and lever gearings to and from the escapement 56.

Figure 9B:
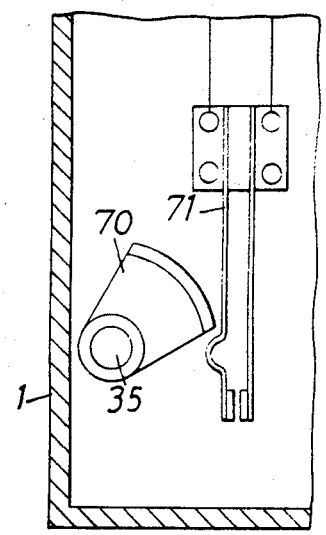

According to the diagram as illustrated in FIGURE 9b, for the release of the time lever 53 there is provided an electrically or electronically working exposure-time control. Here the cocking shaft 35, after its liberation out of the wound-up position by means of the control disc 70, which here comprises an insulated segment, closes a contact 71 for the control current circuit of the electric or electronic exposure-time control, which then in turn, in a manner known per se, according to the time setting in each case, acts by means of current pulses upon the pulling magnet 72 or holding magnet 73 as illustrated in FIGURE 7, and thus causes the release of the time lever 53.

Where the construction of the swinging-flap shutter in accordance with the invention is used in a photographic camera having a reflex apparatus, in cooperation with the cocking shaft 35 there are provided devices which render possible, apart from the shutter cocking, at the same time the return of the reflex mirror 5 into the effective reflex position and the controlling of the diaphragm, provided in the picture-taking objective 2, to the settable diaphragm value.

An example of embodiment of this apparatus is illustrated in FIGURES 10 to 12. According to these, FIGURE 10 shows in lateral elevation and section the position in which the shutter is wound-up or cocked and the reflex mirror is pivoted into the objective reflex position.

FIGURE 11 shows the position in which the shutter has run off and the reflex mirror is pivoted up out of the objective ray path into the ineffective reflex position. FIGURE 12 shows a part of the photographic camera in front elevation and section of FIGURE 11.

According to the example of embodiment the cocking lever 36 is formed as a double-armed lever having a joint 74, with which there is connected a draw-rod 75. The latter is provided with a gripper tooth 76 and is pressed downwards by a torsion spring 77 mounted about the joint 74. On both sides of the holding plate of the reflex mirror 5 there is bent a tab 78, by which the reflex mirror 5 is pivotable about the pivot pins 6 of the viewfinder shaft 7. On the one side of the tab 78 there is secured an engaging pin 79 behind which, when the reflex mirror 5 is hinged up according to FIGURE 11, the draw-rod 75 engages with its gripper tooth 76 and thus moves the reflex mirror 5, in the winding-up movement of the cocking shaft 35, into the effective reflex position. In the latter the reflex mirror 5 is held fast by a blocking pin 80 secured thereto, by means of the blocking lever 81, which is movably arranged in the bearing 82 and is moved into the blocking position by a torsion spring 83. At the moment when the reflex mirror 5 moves back into the effective reflex position and is held fast by the blocking lever 81, the draw-rod 75 with its joint 74 is situated in the region of the dead-point position. In the remainder of the winding-up movement of the cocking shaft 35 the draw-rod 75 comes on to the stop 84 fast with the housing and is uncoupled by the latter from the reflex mirror 5, as shown by FIGURE 10.

The release of the reflex mirror 5 out of the effective reflex position takes place commonly by the blocking lever 45, which at the same time holds the cocking shaft 35 and thus the shutter blocked in the wound-up position. On actuation of the release knob 49 the extended arm of the blocking lever 45, through the intermediate lever 85 which is firmly connected with the blocking lever 81, firstly moves the latter out of the blocking position, so that the reflex mirror 5 is hinged up into the ineffective reflex position by means of a spring 86 held by the pivot pins 6. Shortly thereafter the cocking shaft 35 is liberated for return by the blocking lever 45, and in turn, directly or through a further blocking lever 56 shown in FIGURE 8, instigates the running off of the swinging-flap shutter in the manner as already explained.

Figure 1:
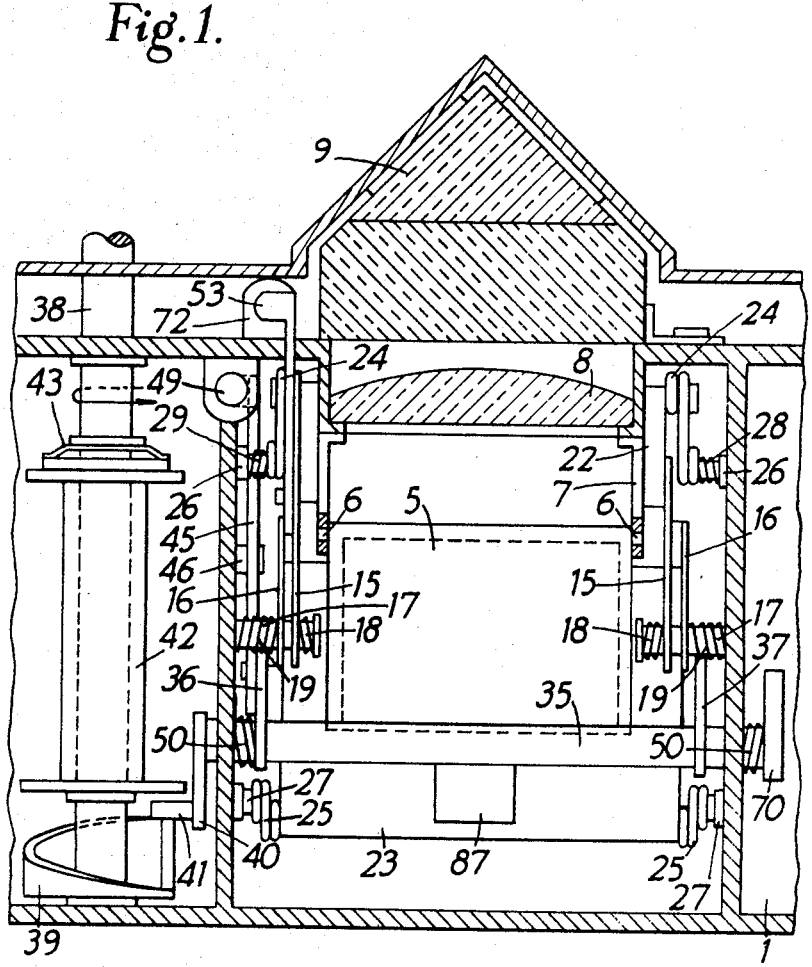
FIGURE 1 shows a part of the camera in front elevation and section, the shutter being situated in the wound-up position and cocked.

On the cocking shaft 35 there is provided, as shown by FIGURES 1, 5 and 6, a further control part 87 which acts upon the plunger 4 which is axially displaceable in the picture-taking objective 2, by which plunger, in a manner known per se the diaphragm 3 is so controllable that when the shutter is cocked it is fully opened, and during the time of the exposure is settable to the diaphragm value adapted thereto.

As appears from the foregoing explanations and the examples of embodiment represented in FIGURES 1–12, by way of summary the invention, in photographic cameras without or with reflex apparatus, is essentially characterised by the combination, that a swinging-flap shutter is provided, in which the swinging-flaps are provided with narrow, cylindrically curved shutter parts and are connected with flexible curtains, and that there is provided a cocking shaft coupled with the winding-up gearing for the film conveying, by which shaft on the one hand the cocking of the shutter and the return of the reflex mirror into the effective position on the other hand the release of the shutter and of the exposure-time duration and the diaphragm are controllable.

I claim:

1. In a photographic camera having a housing, an objective mounted on said housing, a film gate disposed on the optical path through the objective, film supporting means for holding said film against said film gate, film winding mechanism within said housing, shutter cocking mechanism, and gearing for coupling said shutter cocking mechanism with said film winding mechanism for actuation of the latter simultaneously with the shutter cocking mechanism, the provision of (a) a pair of shutter elements pivotally mounted in said housing and capable of abutting each other and swinging between said film gate and the objective, said elements comprising elongated flaps extending over the width of the film gate aperture and each having height less than the height of the film gate aperture, said shutter elements being movable to cocked positions by means of said shutter cocking mechanism, (b) a pair of flexible curtains connected respectively to said shutter elements, said curtains serving to prevent passage of light to the film gate other than that passing between the shutter elements, (c) resilient means which are operatively connected between said housing and said shutter elements for driving the latter on release, and which are tensioned by said shutter elements when the latter are moved to a cocked position by said shutter cocking mechanism, (d) release mechanism for holding said shutter elements in a cocked position and for releasing said elements, (e) and exposure time mechanism coupled with said release mechanism to control the speed of running off of said elements on the initiation of an exposure operation.

2. A photographic camera according to claim 1, wherein said flexible curtains are connected at their ends, remote from the connection to said shutter elements, to an inside surface of the housing.

3. A photographic camera according to claim 1, including tensioning members mounted pivotally within the housing to which the ends of the flexible curtains, remote from the connection to said shutter elements, are connected, and springs urging said tensioning members to effect tensioning of said curtains.

4. A photographic camera according to claim 3, wherein a guide member is provided at the end of each tensioning member, around which guide member the curtain can bend whilst remaining in tension.

5. A photographic camera according to claim 1, wherein said shutter elements are part cylindrical and are pivoted about a common axis.

6. A photographic camera according to claim 1, having a spring loaded reflex mirror pivotally mounted within the housing and having a diaphragm mounted in said objective, wherein said cocking mechanism comprises a rotatable shaft and a spring for urging said shaft towards a rest position thereof, and wherein means, coupled with said shaft, are provided for moving the reflex mirror into the viewing position, and means are also provided, coupled with said shaft, for setting the aperture of said diaphragm.

7. A photographic camera according to claim 6, wherein said cocking mechanism includes a pair of cocking levers mounted on said shaft so as to rotate therewith, said levers being engageable with said shutter elements, wherein said means for moving the reflex mirror to the viewing position includes a draw rod pivotally connected to one of said levers, and wherein said release mechanism includes a spring-loaded release lever pivotally mounted within the housing, and a blocking pin on said one cocking lever engageable with said release lever to hold the cocking lever and consequently said shutter elements in a cocked position.

8. A photographic camera according to claim 7, wherein a blocking lever pivotally mounted within the housing is provided for holding said reflex mirror in the viewing position, said blocking lever being engageable by said one cocking lever after release thereof to effect release of the reflex mirror which pivots out of the optical path, and wherein a fixed pin extends from the housing into the path of movement of the draw rod whereby the latter disengages from the reflex mirror as the mirror becomes releasably secured by said blocking lever.

9. A photographic camera according to claim 8, wherein there is provided an intermediate lever pivotally mounted on a common axis with said blocking lever, said intermediate lever serving to prevent running off of the shutter elements until the reflex mirror has moved out of the viewing position.

10. A photographic camera according to claim 6, wherein there is provided a control element connected to said cocking shaft, which control element serves to initiate operation of the exposure time mechanism, and wherein a further control element is connected to the cocking shaft, which further control element serves to move the diaphragm to the appropriate aperture size.

References Cited
UNITED STATES PATENTS

| | | | |
|---|---|---|---|
| 2,017,979 | 10/1935 | Mayo | 95—58 |
| 2,134,307 | 10/1938 | Mayo | 95—55 |
| 2,338,657 | 1/1944 | Mihalyi | 95—58 |
| 2,827,839 | 3/1958 | Fuerst | 95—58 |
| 2,933,995 | 4/1960 | Hino | 95—58 |
| 3,122,078 | 2/1964 | Singer | 95—42 |
| 3,277,806 | 10/1966 | Wagner et al. | 95—55 |

NORTON ANSHER, Primary Examiner

R. L. MOSES, Assistant Examiner

U.S. Cl. X.R.

95—15, 55, 60